United States Patent
Ho et al.

(10) Patent No.: US 8,908,581 B2
(45) Date of Patent: Dec. 9, 2014

(54) EXTENDED MICROSLEEP FOR COMMUNICATIONS

(75) Inventors: Sai Yiu Duncan Ho, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 780 days.

(21) Appl. No.: 12/112,268

(22) Filed: Apr. 30, 2008

(65) Prior Publication Data

US 2009/0016252 A1 Jan. 15, 2009

Related U.S. Application Data

(60) Provisional application No. 60/915,421, filed on May 1, 2007.

(51) Int. Cl.
*H04W 52/02* (2009.01)

(52) U.S. Cl.
CPC ...... *H04W 52/0283* (2013.01); *H04W 52/0241* (2013.01)
USPC ........................................ 370/311; 455/343.2

(58) Field of Classification Search
None
See application file for complete search history.

(56) References Cited

U.S. PATENT DOCUMENTS

| 6,519,469 | B1 * | 2/2003 | Rydnell et al. ................ 455/466 |
| 6,665,307 | B1 * | 12/2003 | Rydnell et al. ................ 370/437 |
| 2003/0105983 | A1 * | 6/2003 | Brakmo et al. ............... 713/320 |
| 2006/0072614 | A1 | 4/2006 | Ogiso et al. |
| 2006/0187876 | A1 * | 8/2006 | Schmidl et al. ............... 370/328 |
| 2009/0005127 | A1 * | 1/2009 | Frenger et al. ................ 455/574 |
| 2010/0056164 | A1 | 3/2010 | Ishii et al. |
| 2010/0135159 | A1 * | 6/2010 | Chun et al. ................... 370/241 |

FOREIGN PATENT DOCUMENTS

| JP | 2001500325 A | 1/2001 |
| JP | 2004297394 A | 10/2004 |
| JP | 2007043431 A | 2/2007 |
| RU | 2295830 C2 | 3/2007 |
| RU | 2295842 | 3/2007 |

(Continued)

OTHER PUBLICATIONS

Nokia: "3GPP TSG-RAN WG2 Meeting #56 R2-063081: Active Mode DRX Details" 3rd Generation Partnership Project (3GPP); Technical Specification Group (TSG) Radio Access Network (RAN); Working Group 2 (WG2) vol. R2-063081, (Nov. 10, 2006), p. 1-10.

(Continued)

*Primary Examiner* — Robert C Scheibel
(74) *Attorney, Agent, or Firm* — Anthony R. Morris

(57) ABSTRACT

Systems and methodologies are described that facilitate operating an access terminal in an LTE based wireless communication environment utilizing extended microsleep. While in non-DRX mode, an access terminal can operate in on state for a first period of time and in extended microsleep state for a second period of time. Further, the first and second periods of time can form a repeating pattern where these periods of time alternate. Thus, the access terminal can turn on its receiver for the first period of time (e.g., decode downlink information while in on state) and turn off its receiver for the second period of time (e.g., inhibit decoding of downlink information while in extended microsleep state). Further, the first period of time in the repeating pattern can be one TTI (e.g., 1 ms) and the second period of time in the repeating pattern can be a plurality of TTIs (e.g., 5 ms).

53 Claims, 12 Drawing Sheets

(56) References Cited

FOREIGN PATENT DOCUMENTS

| WO | WO9737504 A1 | 10/1997 |
|---|---|---|
| WO | WO02080600 A1 | 10/2002 |
| WO | WO2004098093 A1 | 11/2004 |
| WO | WO2006022727 A1 | 3/2006 |
| WO | WO2007025138 | 3/2007 |
| WO | WO2007084045 A1 | 7/2007 |

OTHER PUBLICATIONS

International Search Report—PCT/US08/062291, International Search Authority—European Patent Office—Sep. 3, 2008.
Written Opinion—PCT/US08/062291, International Search Authority—European Patent Office—Sep. 3, 2008.
3rd Generation Partnership Project; Technical Specification Group Radio Access Network; Evolved Universal Terrestrial Radio Access (E-UTRA); Physical Channels and Modulation (Release 8); 3GPP TS 36.211 V8.2.0 (Mar. 2008).
3GPP TSG-RAN WG2 Meeting #56bis, "Handover Procedure for DRX Operation in LTE_Active", Ericsson, Jan. 19, 2007, R2-070043.
Taiwan Search Report—TW097116141—TIPO—Oct. 31, 2012.

* cited by examiner

EXTENDED MICROSLEEP FOR COMMUNICATIONS

CROSS-REFERENCE TO RELATED APPLICATIONS

This application claims the benefit of U.S. Provisional Patent application Ser. No. 60/915,421 entitled "EXTENDED MICROSLEEP FOR COMMUNICATIONS" which was filed May 1, 2007. The entirety of the aforementioned application is herein incorporated by reference.

BACKGROUND

I. Field

The following description relates generally to wireless communications, and more particularly to employing extended microsleep for an access terminal in a Long Term Evolution (LTE) based wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

Access terminals operating in wireless communications systems commonly include transmitters and receivers for sending and obtaining signals, respectively. Transmitters and receivers of the access terminals (as well as any other components of the access terminals) can be powered by batteries while such devices are in an operational state. For example, a receiver of an access terminal consumes battery power while monitoring for data intended for that access terminal sent over a downlink channel from a base station (e.g., decoding received data to determine whether such data is directed to that access terminal), while battery power can be conserved when the receiver foregoes such monitoring. Battery power consumed by an access terminal can depend at least in part on configuration of the access terminal and/or functions (e.g., operations) being performed by the access terminal. As such, reducing an amount of battery power utilized by an access terminal can result in extended battery life and decreased cost of use for the access terminal in addition to improved overall performance of the access terminal.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating operation of an access terminal in an LTE based wireless communication environment utilizing extended microsleep. While in non-DRX mode, an access terminal can operate in on state for a first period of time and in extended microsleep state for a second period of time. Further, the first and second periods of time can form a repeating pattern where these periods of time alternate. Thus, the access terminal can turn on its receiver for the first period of time (e.g., decode downlink information while in on state) and turn off its receiver for the second period of time (e.g., inhibit decoding of downlink information while in extended microsleep state). Further, the first period of time in the repeating pattern can be one TTI (e.g., 1 ms) and the second period of time in the repeating pattern can be a plurality of TTIs (e.g., 5 ms).

According to related aspects, a method that facilitates operating an access terminal in a Long Term Evolution (LTE) based wireless communication environment is described herein. The method can include switching an access terminal to an on state for a first time period of a pattern to decode a downlink transmission during at least a portion of the first time period. Further, the method can include switching the access terminal to an extended microsleep state for a second time period of the pattern during which decoding is inhibited. Moreover, the method can comprise continuing to switch the access terminal between states according to the pattern by repeating the first time period and the second time period in an alternating manner.

Another aspect relates to a wireless communications apparatus. The wireless communications apparatus can include a memory that retains instructions related to switching to an on state for a first time period decode a downlink transmission during at least a portion of the first time period, switching to an extended microsleep state for a second time period during which decoding is inhibited, determining whether an inactivity timer has expired, continuing to switch between states in a repeated, alternating manner so long as the inactivity timer is determined to have not expired, and transitioning to a discontinuous reception (DRX) mode upon the inactivity timer being determined to have expired. Further, the wireless communications apparatus can include a processor, coupled to the memory, configured to execute the instructions retained in the memory.

Yet another aspect relates to a wireless communications apparatus that enables operating an access terminal with changeable mode and sleep state in a Long Term Evolution (LTE) based wireless communication environment. The wireless communications apparatus can include means for transitioning to operation in a non-discontinuous reception (non- DRX) mode. Further, the wireless communications apparatus can include means for switching between an on state and an extended microsleep state according to a predetermined pattern. Moreover, the wireless communications apparatus can comprise means for determining whether a threshold amount of inactivity time has been reached. Additionally, the wireless communications apparatus can include means for transitioning to operation in a discontinuous reception (DRX) mode upon reaching the threshold amount of inactivity time.

Still another aspect relates to a computer program product that can comprise a computer-readable medium. The computer-readable medium can include code for switching an access terminal to an on state for a first time period of a pattern to decode a downlink transmission during at least a portion of the first time, period; code for switching the access terminal to an extended microsleep state for a second time period of the pattern during which decoding is inhibited; and code for continuing to switch the access terminal between states according to the pattern by repeating the first time period and the second time period in an alternating manner.

In accordance with another aspect, an apparatus in a wireless communication system can include a processor, wherein the processor can be configured to switch to an on state for a first time period decode a downlink transmission during at least a portion of the first time period. Further, the processor can be configured to switch to an extended microsleep state for a second time period during which decoding is inhibited. The processor can also be configured to determine whether an inactivity timer has expired. Moreover, the processor can be configured to continue to switch between states in a repeated, alternating manner so long as the inactivity timer is determined to have not expired. Additionally, the processor can be configured to transition to a discontinuous reception (DRX) mode upon the inactivity timer being determined to have expired.

According to other aspects, a method that facilitates controlling a state of an access terminal in a Long Term Evolution (LTE) based wireless communication environment is described herein. The method can include transmitting signals to an access terminal to control transitioning between an on state, a microsleep state, and an extended microsleep state. Further, the method can comprise tracking access terminal state as a function of time based at least in part upon the transmitted signals. Moreover, the method can include identifying a time to send a packet to the access terminal based upon the tracked state.

Yet another aspect relates to a wireless communications apparatus that can include a memory that retains instructions related to sending signals to an access terminal to control switching between an on state, a microsleep state, and an extended microsleep state, tracking access terminal state as a function of time based at least in part upon the transmitted signals, and recognizing a time to transfer a packet to the access terminal based upon the tracked state. Further, the wireless communications apparatus can comprise a processor, coupled to the memory, configured to execute the instructions retained in the memory.

Another aspect relates to a wireless communications apparatus that enables managing sleep states of an access terminal in a Long Term Evolution (LTE) based wireless communication environment. The wireless communications apparatus can include means for sending signals to an access terminal to control transitioning between an on state, a microsleep state, and an extended microsleep state according to a pattern. Moreover, the wireless communications apparatus can include means for tracking access terminal state as a function of time based at least in part upon the sent signals. The wireless communications apparatus can also comprise means for determining a time to send a packet to the access terminal based upon the tracked state. Further, the wireless communications apparatus can include means for transmitting the packet to the access terminal at the determined time.

Still another aspect relates to a computer program product that can comprise a computer-readable medium. The computer-readable medium can include code for transferring signals to an access terminal to control transitioning between an on state, a microsleep state, and an extended microsleep state according to an extended microsleep pattern; code for tracking access terminal state and access terminal mode as a function of time based at least in part upon the sent signals; code for deciphering a time to send a packet to the access terminal based upon the tracked state and mode: and code for sending the packet to the access terminal at the deciphered time.

In accordance with another aspect, an apparatus in a wireless communication system can include a processor, wherein the processor can be configured to transmit signals to an access terminal to control transitioning between an on state, a microsleep state, and an extended microsleep state. Further, the processor can be configured to track access terminal state as a function of time based at least in part upon the transmitted signals. Moreover, the processor can be configured to identify a time to send a packet to the access terminal based upon the tracked state.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
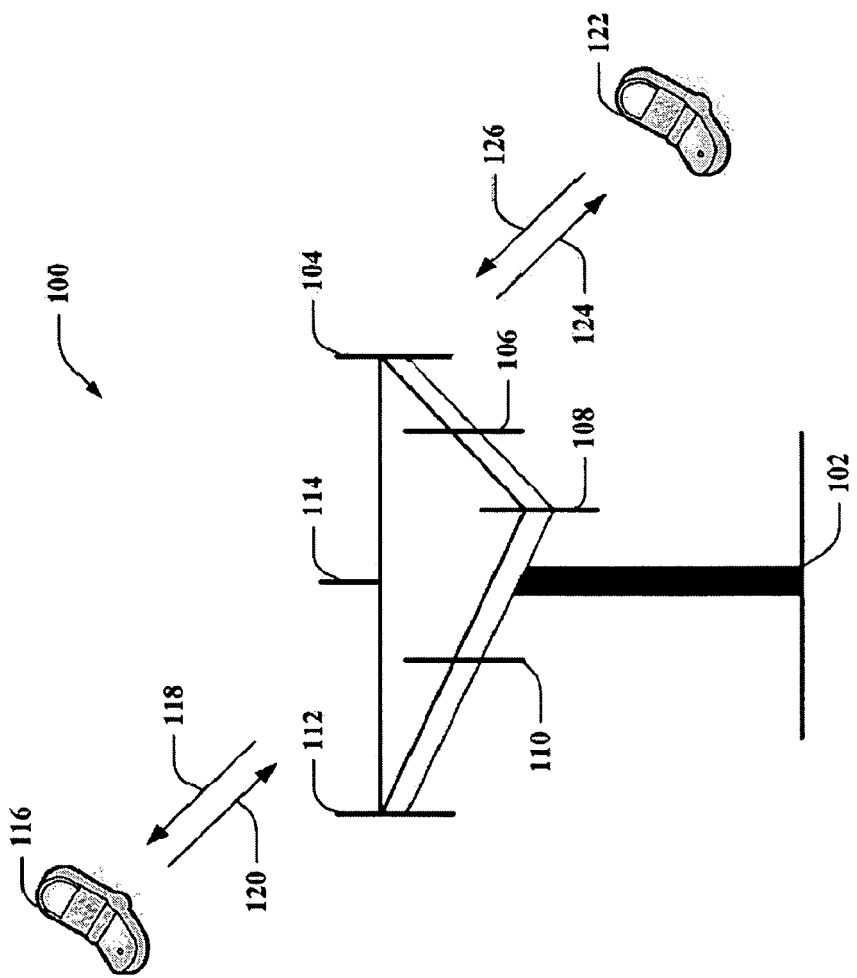
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

System 100 can employ a battery saving approach for operation of access terminals 116 and 122. More particularly, system 100 can utilize discontinuous reception (DRX) mode to conserve battery power of access terminals 116 and 122, where each access terminal 116, 122 negotiates with the network (e.g., base station 102, . . . ) to identify and/or schedule DRX phases during which that access terminal 116, 122 employs its respective receiver to listen for information (e.g., control information, transmissions on a control channel, . . . ) transferred over the downlink intended for the particular access terminal 116, 122. Additionally or alternatively, these DRX phases during which respective receivers of access terminals 116, 122 are operational to obtain transferred information can be set forth according to a predefined protocol. During differing times other than when such listening for transferred information is scheduled, each access terminal 116, 122 can turn its respective receiver off and enter a low power state (e.g., sleep state, . . . ). Thus, each access terminal 116, 122 can utilize a DRX cycle with an "on-duration" during which a receiver can be activated to monitor for information sent over a downlink channel direct to the particular access terminal 116, 122 and an "off-duration" during which the receiver can be deactivated to yield power savings. Moreover, during a DRX cycle (e.g., during the "on-duration" and the "off-duration" of the DRX cycle), data exchange between base station 102 and each access terminal 116, 122 can be inhibited (e.g., while other information such as, for example, control information can be received during the "on-duration" of the DRX cycle).

The following example describes access terminal 116, however, it is to be appreciated that this can additionally or alternatively relate to access terminal 122 and/or any disparate access terminal(s) (not shown). To allow for receiving data from base station 102, access terminal 116 can switch to continuous reception (CRX) mode (e.g., non-DRX mode). CRX can allow for active data exchange between base station 102 and access terminal 116. Hence, access terminal 116 operating in CRX mode can receive data and/or control information. However, use of access terminal 116 in CRX mode can consume more power as compared to operation in DRX mode.

Per the $3^{rd}$ Generation Partnership Project (3GPP) design of the DRX feature in Long Term Evolution (LTE), when access terminal 116 receives data (e.g., transmission on the control channel) during DRX, that access terminal 116 transitions to continuous monitoring. While in continuous monitoring, an access terminal conventionally is unable to switch its receiver to an off state for a short period of time such as, for instance, between consecutive packets. On the contrary, system 100 allows access terminal 116, while in non-DRX mode (e.g., CRX mode, . . . ), to employ an on/off switching pattern whereby the receiver is activated for a first period of time and deactivated for a second period of time; the pattern of activation during the first period of time and deactivation during the second period of time can be repeated. By way of example, use of such a pattern can support Voice over Internet Protocol (VoIP) while enhancing power savings associated with access terminal 116.

Accordingly, system 100 allows access terminal 116, while in non-DRX (e.g., CRX), to turn on a corresponding receiver (e.g., receiver included within access terminal 116, receiver coupled to access terminal 116, . . . ) for a short period of time (e.g., 1 ms, . . . ) to receive packet(s) and then go back to sleep for a short period of time (e.g., 5 ms, . . . ). Further, this pattern of listening for packet(s) and sleeping can be repeated by access terminal 116. Moreover, after a threshold amount of time where packet(s) are not received, access terminal 116 can transition to DRX mode (e.g., from non-DRX mode such as, for instance, CRX mode, . . . ). As noted above, although the foregoing example described access terminal 116, it is to be appreciated that such example can similarly apply to access terminal 122 and/or any disparate access terminal(s) (not shown). Additionally, although many of the examples herein describe employing a pattern of switching a receiver on for 1 ms (e.g., 1 Transmission Time Interval (TTI)) and off for 5 ms (e.g., 5 TTIs) (or on for 0.5 ms and off for 5.5 ms), it is to be appreciated that any sized TTI can be used and/or the receiver can be switched on and off for any length of time/number of TTIs (e.g., on for less than 1 TTI, 1 TTI, more than 1 TTI, off for less than 5 TTIs, 5 TTIs, greater than 5 TTIs, on for less than 1 ms, 1 ms, more than 1 ms, off for less than 5 ms, 5 ms, more than 5 ms, . . . ) in a repeating pattern.

Figure 2:
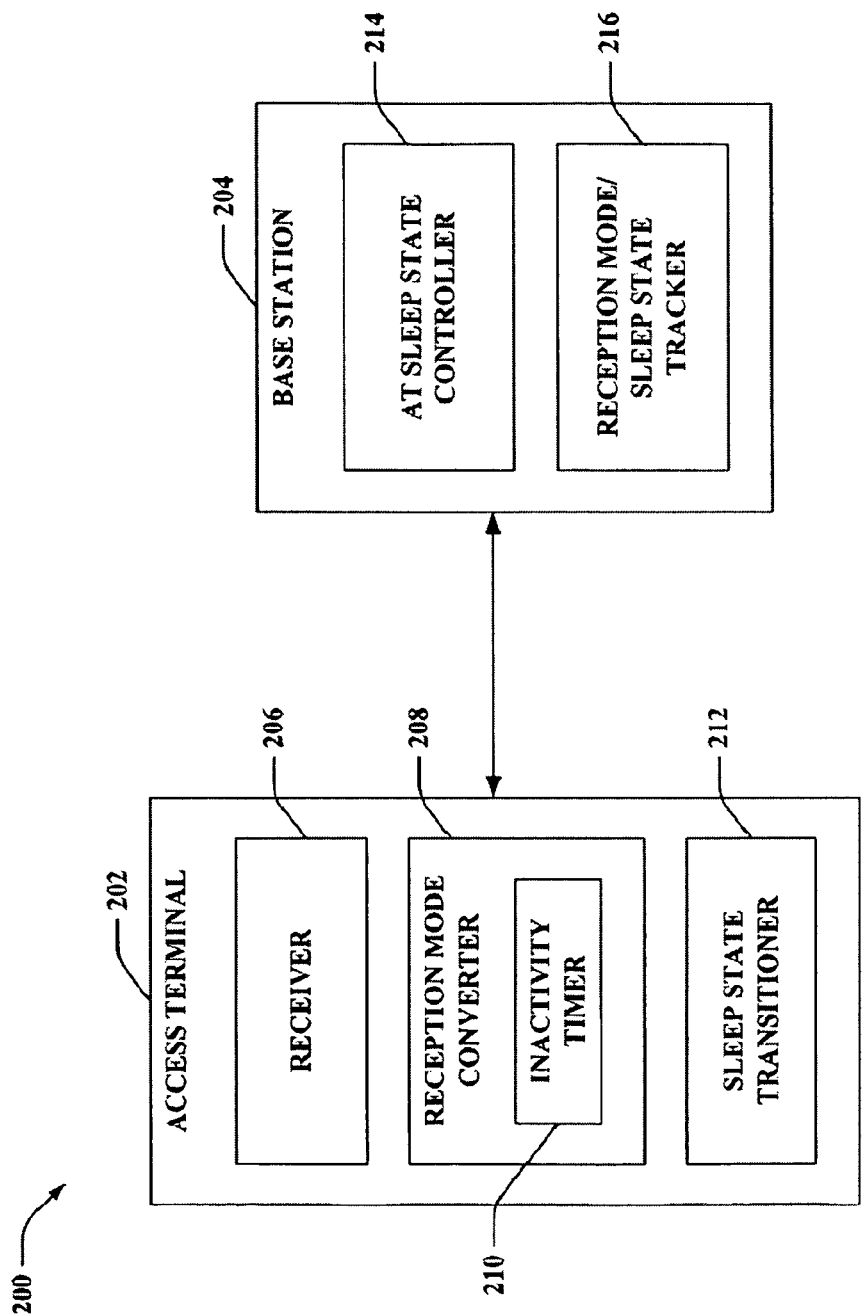
FIG. 2 is an illustration of an example system that allows an access terminal to utilize an extended microsleep state while operating in an LTE based wireless communication environment.

Turning to FIG. 2, illustrated is a system 200 that allows an access terminal to utilize an extended microsleep state while operating in an LTE based wireless communication environment. System 200 includes an access terminal 202 and a base station 204, which can communicate with each other. Although one access terminal 202 and one base station 204 are illustrated, it is to be appreciated that system 200 can include a plurality of access terminals, each of which can be similar to access terminal 202, and/or a plurality of base stations, each of which can be similar to base station 204.

Access terminal 202 can receive information, signals, data, instructions, commands, bits, symbols, and the like sent from base station 204 over one or more downlink channels. Access terminal 202 can include a receiver 206 to receive such information, signals, data, instructions, commands, bits, symbols, etc. For instance, the receiver 206 can receive a signal from a receive antenna (not shown), and perform typical actions thereon (e.g., filter, amplify, downconvert, demodulate, . . . ) the received signal and digitize the conditioned signal to obtain samples. Similarly, although not shown, base station 204 can include a receiver (not shown) to perform similar actions upon received information, signals, data, instructions, commands, bits, symbols, and so forth sent from access terminal 202 over one or more uplink channels.

Access terminal 202 can further include a reception mode converter 208 that controls a reception mode utilized by access terminal 202 (e.g., reception mode utilized by receiver 206 of access terminal 202) at a particular time. For instance, reception mode converter 208 can alter a reception mode used by access terminal 202; thus, reception mode converter 208 can switch to and/or from use of a DRX mode, a non-DRX mode (e.g., CRX mode, . . . ), a combination thereof, and so forth. By way of example, upon receiver 206 obtaining data (e.g., receiving/decoding a transmission on a downlink control channel directed to access terminal 202, . . . ) while in DRX mode, reception mode converter 208 can switch to use of non-DRX mode (e.g., CRX mode, . . . ) for access terminal 202. Reception mode converter 208 controls access terminal 202 to transition to continuous reception (e.g., non-DRX, CRX, . . . ) when access terminal 202 receives (e.g., via receiver 206) a packet during an interval when receiver 206 is on (e.g., during an "on-duration" of a DRX cycle). In accordance with another illustration, reception mode converter 208 can change the mode used by access terminal 202 in response to explicit Media Access Control (MAC) signaling (e.g., from base station 204, . . . ); reception mode converter 208 (and/or access terminal 202 in general) can obtain MAC signaling utilized to effectuate changing access terminal 202 from operating in DRX mode to non-DRX mode, from non-DRX mode to DRX mode, and/or between any differing modes. According to another example, reception mode converter 208 can change the mode (e.g., to non-DRX mode, from DRX mode, . . . ) utilized by access terminal 202 upon access terminal 202 sending an uplink signal, for instance, upon a Random Access Channel (RACH).

Reception mode converter 208 can further include an inactivity timer 210 that monitors whether access terminal 202 obtains data (e.g., via receiver 206, from base station 204, . . . ) while in non-DRX mode and/or a length of time since such data was last obtained. Inactivity timer 210 can be used so if access terminal 202 does not receive any data during non-DRX for greater than a threshold length of time (e.g., inactivity timer 210 expires), then reception mode converter 208 can switch access terminal 202 back to DRX mode. The threshold length of time utilized by inactivity timer 210 can be set in any manner. For example, the threshold length of time can be predefined, generated based upon a function, retained in memory (e.g., of access terminal 202, base station, 204, any disparate node (not shown) in system 200, . . . ), adjusted by a user, altered based upon trend analysis, controlled by a signal sent from base station 204, and so forth; however, it is to be appreciated that the foregoing are set forth as illustrations and the claimed subject matter is not so limited.

Moreover, access terminal 202 can include a sleep state transitioner 212 that switches access terminal 202 (e.g., receiver 206) to and/or from an on state, a microsleep state, an extended microsleep state, a combination thereof, and so forth. For instance, sleep state transitioner 212 can be utilized to alter the state of access terminal 202 between on, microsleep, and extended microsleep while access terminal 202 is in non-DRX mode (e.g., as controlled by reception mode converter 208). Sleep state transitioner 212 can adjust the state of access terminal 202 in response to a signal (e.g., explicit MAC signaling, . . . ) obtained from base station 204. Additionally or alternatively, sleep state transitioner 212 can change the state of access terminal 202 using a predefined pattern. For example, sleep state transitioner 212 can employ both a predefined pattern and explicit MAC signaling to control the state of access terminal 202. Use of sleep state transitioner 212 can enable access terminal 202 to sleep even during non-DRX.

Further, base station 204 can include an access terminal (AT) sleep state controller 214. AT sleep state controller 214 can yield explicit signaling that can be transmitted to access terminal 202 and used by sleep state transitioner 212 of access terminal 202 to adjust whether access terminal 202 is in a sleep state (e.g., microsleep, extended microsleep, . . . ) and/or an on state. Use of AT sleep state controller 214 can allow base station 204 to control a sleep pattern employed by access terminal 202 (e.g., while access terminal 202 is in non-DRX mode, . . . ). Moreover, although not shown, it is to be appreciated that AT sleep state controller 214 can similarly manage sleeping of any number of disparate access terminals (not shown) utilizing MAC signaling. Further, AT sleep state controller 214 (and/or a disparate component of base station 204 and/or base station 204 in general) can use explicit MAC signaling to control the mode of access terminal 202 (e.g., signaling that can be leveraged by reception mode converter 208 of access terminal 202 to change between differing modes such as DRX and non-DRX, . . . ).

Moreover, base station 204 can further comprise a reception mode/sleep state tracker 216 that follows a current mode and/or sleep state of access terminal 202 (and/or any number of disparate access terminals (not shown)). Reception mode/sleep state tracker 216 can query access terminal 202 for information concerning its current mode and/or sleep state, for example. By way of another illustration, reception mode/sleep state tracker 216 can decipher the current mode and/or sleep state of access terminal 202 as a function of explicit MAC signaling transferred to access terminal 202 from base station 204 (e.g., explicit MAC signaling yielded by AT sleep state controller 214 that adjusts sleep state, explicit MAC signaling that alters reception mode, . . . ). Moreover, reception mode/sleep state tracker 216 can determine the mode and/or sleep state of access terminal 202 at a future moment in time and/or previous point in time (e.g., based upon a predefined protocol, information related to explicit signaling retained in memory of base station 204, . . . ). Further, reception mode/sleep state tracker 216 can be leveraged by base station 204 to identify when to transmit packet(s) directed to access terminal 202. By way of illustration, reception mode/sleep state tracker 216 can recognize particular time(s) during which receiver 206 decodes downlink channel(s) based upon the modes and sleep states of access terminal 202; thus, base station 204 can transfer packet(s) via these channel(s) during the identified time(s) (e.g., rather than during differing times when receiver 206 is off).

The following example illustrates operation of system 200, yet it is to be appreciated that the claimed subject matter is not so limited. System 200 can employ Transmission Time Intervals (TTIs) (e.g., subframes) that are each 1 ms (however, any sized TTI is contemplated). Each TTI can be an independently decodable transmission on the radio link. Further, each TTI can be split into two parts: a control channel part and a data part (e.g., the control channel part can be 0.5 ms and the data part can be 0.5 ms when each TTI is 1 ms). While in non-DTX mode (e.g., as controlled by reception mode converter 208), receiver 206 can decode the control channel part of a TTI to determine whether control channel information sent therein (e.g., from base station 204) is directed to access terminal 202. If upon decoding the control channel part of the TTI it is recognized that the control channel information is directed to access terminal 202, then access terminal 202 (e.g., receiver 206) can decode the data part of the TTI.

However, when control channel information directed to access terminal 202 is determined to be lacking from the control channel part of the TTI, sleep state transitioner 212 can switch access terminal 202 to microsleep state for the data part of the TTI (e.g., access terminal 202 can sleep for 0.5 ms when in microsleep state, . . . ). Thus, during a second half of the TTI (e.g., second half of the 1 ms interval), sleep state transitioner 212 can switch access terminal 202 to sleep (e.g., switch access terminal 202 to microsleep state, . . . ). For instance, MAC signaling (e.g., initiated by AT sleep state controller 214 of base station 204) can control sleep state transitioner 212 to change to microsleep state. Additionally or alternatively, sleep state transitioner 212 can utilize a predefined pattern to change from on state to microsleep state under such a scenario.

Further, from microsleep state, sleep state transitioner 212 can transition access terminal 202 to extended microsleep state. For example, extended microsleep state can last for 5 ms; however, it is to be appreciated that any length of time during which access terminal 202 sleeps can be utilized for extended microsleep state. Moreover, MAC signaling (e.g., sent by AT sleep state controller 214 of base station 204) can be used to transition between microsleep state and extended microsleep state (e.g., as implemented by sleep state transitioner 212). By way of illustration, in extended microsleep state, receiver 206 can remain off for both parts (e.g., control channel and data parts) of a plurality of TTIs (e.g., 5 TTIs, 5 ms where each TTI is 1 ms, . . . ). Thus, any information, data, signals, etc. sent over the downlink during these plurality of TTIs, whether in the control channel or data parts of such TTIs, will not be decoded, which can yield power savings associated with access terminal 202.

Pursuant to the foregoing, if no information pertaining to access terminal 202 is received during a first 0.5 ms of a TTI (e.g., control channel part of the TTI) as determined when receiver 206 is on, then access terminal 202 can switch to microsleep state (e.g., as controlled by sleep state transitioner 212). Access terminal 202 can remain in microsleep state for the second 0.5 ms of the TTI (e.g., data part of the TTI). Moreover, after the second 0.5 ms of the TTI, access terminal 202 can be moved to extended microsleep state by sleep state transition 212 for 5 ms. After the 5 ms in extended microsleep state, access terminal 202 can be returned to an on state again by sleep state transitioner 212 to allow for monitoring a first 0.5 ms of a TTI. Such pattern can repeat (e.g., using explicit MAC signaling from AT sleep state controller 214 and/or a predefined pattern) for a threshold amount of time as monitored by inactivity timer 210 so long as information directed to access terminal 202 is lacking from decoded control channel parts of TTIs, and upon reaching the threshold, reception mode converter 208 can switch access terminal 202 from non-DRX mode to DRX mode.

Thus, the sleep period during which receiver 206 is inhibited from decoding control channel information can be extended by an additional 5 ms when extended microsleep state is utilized along with microsleep state (as compared to use of microsleep state without extended microsleep state). Extending the amount of sleep time can yield power savings since access terminal 202 need not awaken nor monitor downlink channel(s) (e.g., with receiver 206) while sleeping.

Figure 3:
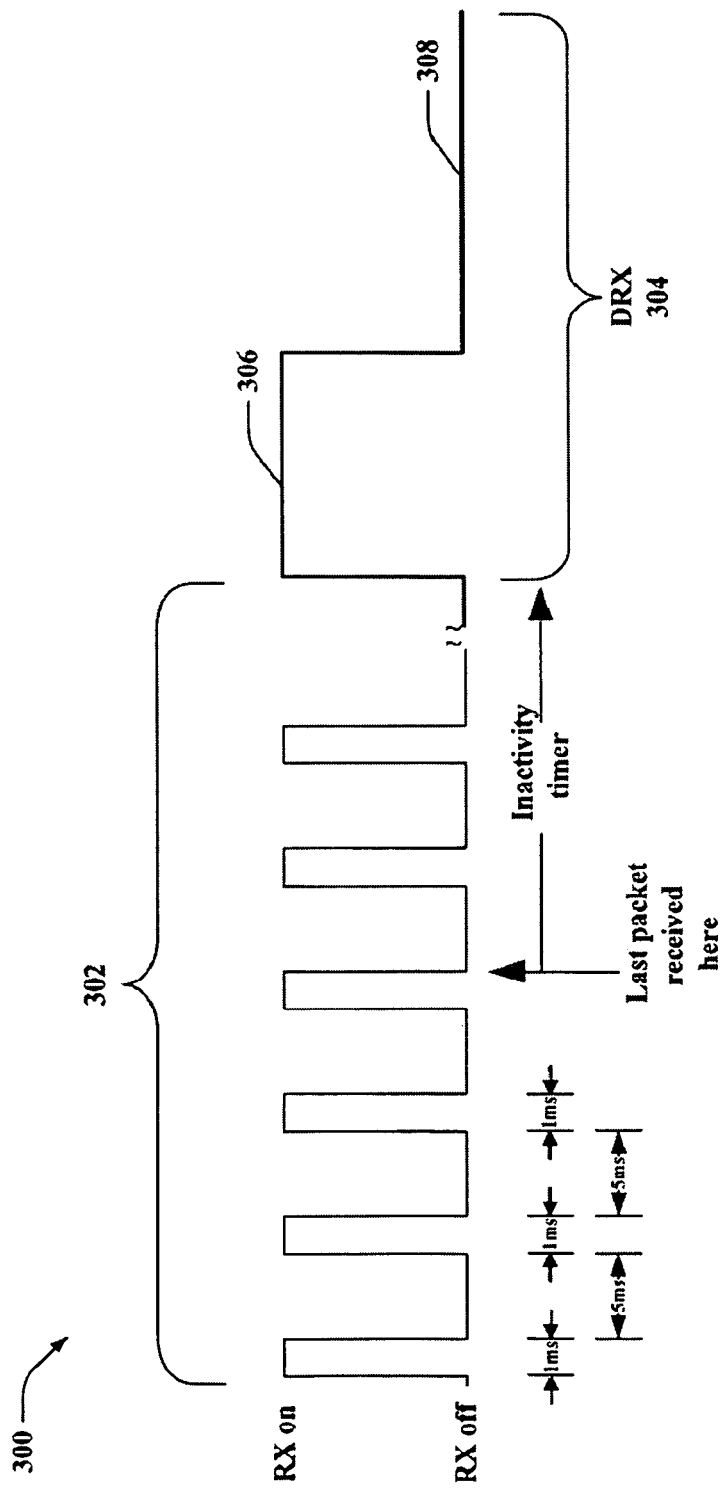
FIG. 3 is an illustration of an example timing diagram illustrating use of extended microsleep for an access terminal in an LTE based wireless communication system.

With reference to FIG. 3, illustrated is an example timing diagram 300 illustrating use of extended microsleep for an access terminal (e.g., access terminal 202 of FIG. 2) in an LTE based wireless communication system. During portion 302, the access terminal can be in non-DRX mode. As such, a receiver (e.g., receiver 206 of FIG. 2) can be on for 1 ms (e.g., a TTI) and off for a 5 ms interval (e.g., 5 TTIs, . . . ). This pattern of 1 ms on and 5 ms off for the receiver can be a repeated pattern. Further, although not shown, it is to be appreciated that the receiver can be on during a first half of a 1 ms interval (e.g., 0.5 ms associated with a control channel part of the TTI) and, when no control information pertaining to the access terminal is received during the first half of the particular 1 ms interval, the receiver can be turned off during a second half of the given 1 ms interval (e.g., 0.5 ms associated with a data part of the TTI). According to this illustration, the pattern employed by the access terminal during portion 302 can be to activate the receiver for 0.5 ms and deactivate the receiver for 5.5 ms, where these periods of activation and deactivation can be repeated.

Moreover, during portion 302, an inactivity timer can operate to monitor an amount of time since a last packet directed to the access terminal was received. Thus, if the access terminal does not receive any data during non-DRX for a threshold amount of time, the access terminal can enter DRX at 304 when the timer expires. In DRX 304, an "on-duration" 306 and an "off-duration" 308 for the receiver of the access terminal can be employed (e.g., where the "on-duration" 306 and the "off-duration" 308 can be repeated (not shown)). Further, although not shown, upon the receiver obtaining data during DRX, the access terminal can transition to continuous monitoring (e.g., non-DRX mode, portion 302, . . . ). Moreover, even though it is not depicted, it is to be appreciated that the access terminal can go to extended microsleep during the "on-duration" 306 of the DRX cycle 304 (e.g., using a pattern similar to the on/off pattern utilized in portion 302, . . . ).

Figure 4:
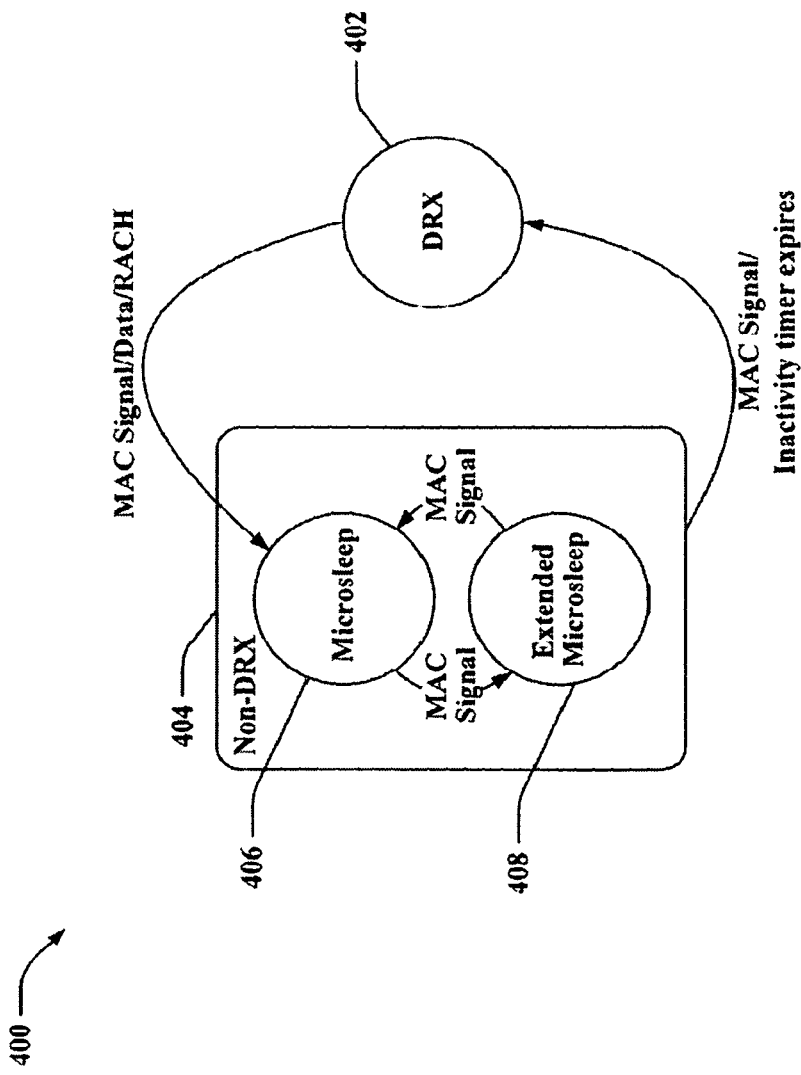
FIG. 4 is an illustration of an example state diagram associated with an access terminal in an LTE based wireless communication system.

Now turning to FIG. 4, illustrated is an example state diagram 400 associated with an access terminal in an LTE based wireless communication system. State diagram 400 includes two modes: DRX mode 402 and non-DRX mode 404. The access terminal (e.g., access terminal 202 of FIG. 2) can transition from DRX mode 402 to non-DRX mode 404 based upon a received MAC signal (e.g., explicit MAC signaling initiated by base station 204 of FIG. 2), data being received while in DRX mode 402 (e.g., data obtained from base station 204 intended for access terminal 202), and/or the access terminal sending a transmission over a RACH (e.g., to base station 204). Further, the access terminal can transition from non-DRX mode 404 to DRX mode 402 in response to a received MAC signal (e.g., explicit MAC signaling initiated by base station 204) and/or an inactivity timer expiring (e.g., reaching the threshold amount of time set by inactivity timer 210 of FIG. 2).

While in non-DRX mode 404, the access terminal can switch between microsleep state 406 and extended microsleep state 408. For instance, such switching can occur based upon received MAC signals (e.g., MAC signaling initiated by AT sleep state controller 214 of FIG. 2). Thus, a desired sleep related pattern for the access terminal (e.g., the receiver 206 of FIG. 2) can be achieved by explicit MAC signaling. Additionally or alternatively, a predefined pattern can be used by the access terminal to transition between sleep and non-sleep states while in non-DRX mode 404; for instance, the predefined pattern can be used with explicit MAC signaling to effectuate such sleep state related transitions.

Further, although not shown, the access terminal can transition to and/or from an on state while in non-DRX mode 404. Thus, the access terminal can transition (or be transitioned) between on state and microsleep state 406. Moreover, the access terminal can transition (or be transitioned) between on state and extended microsleep state 408.

Figure 5:
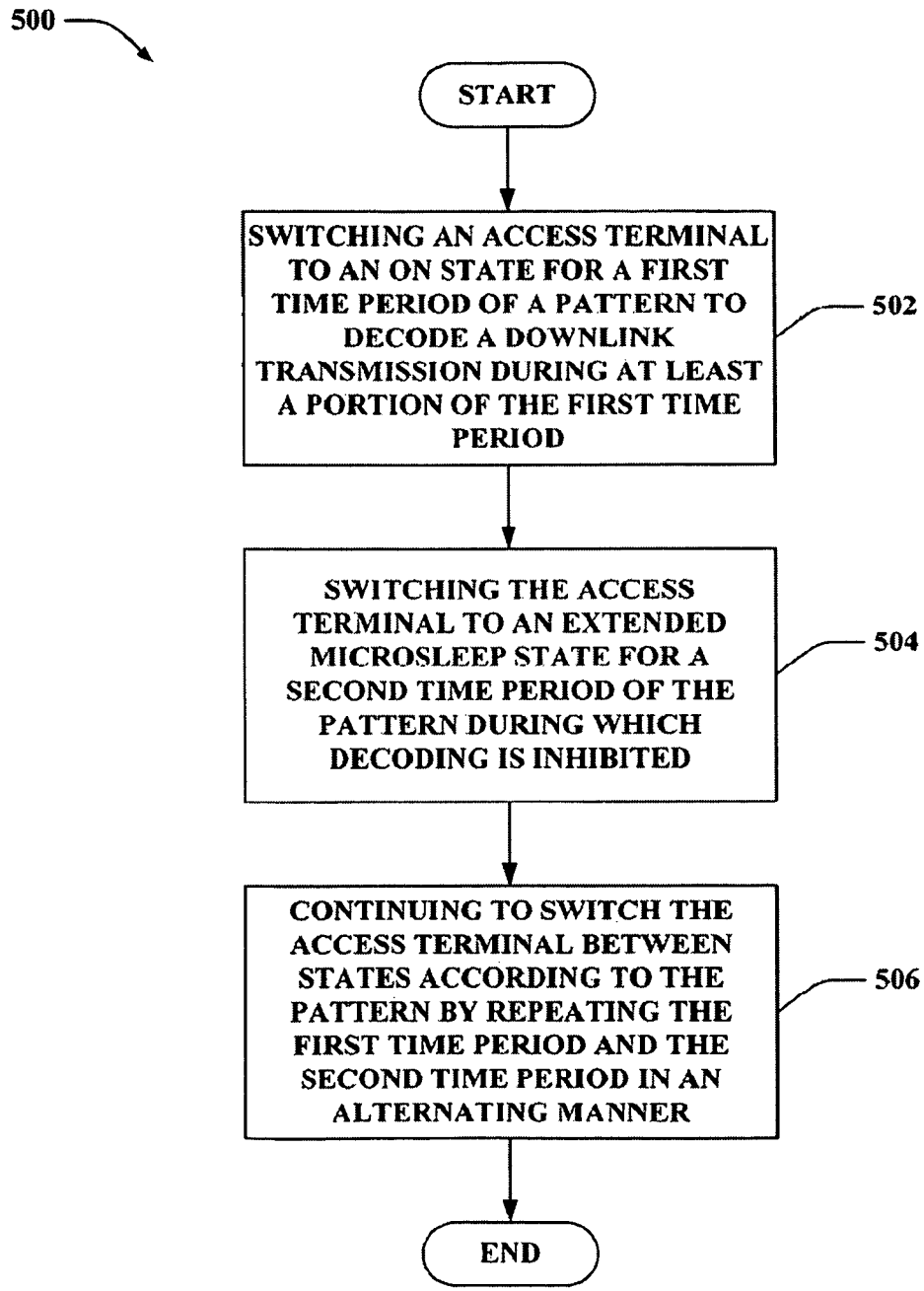
FIG. 5 is an illustration of an example methodology that facilitates operating an access terminal in an LTE based wireless communication environment.
Figure 6:
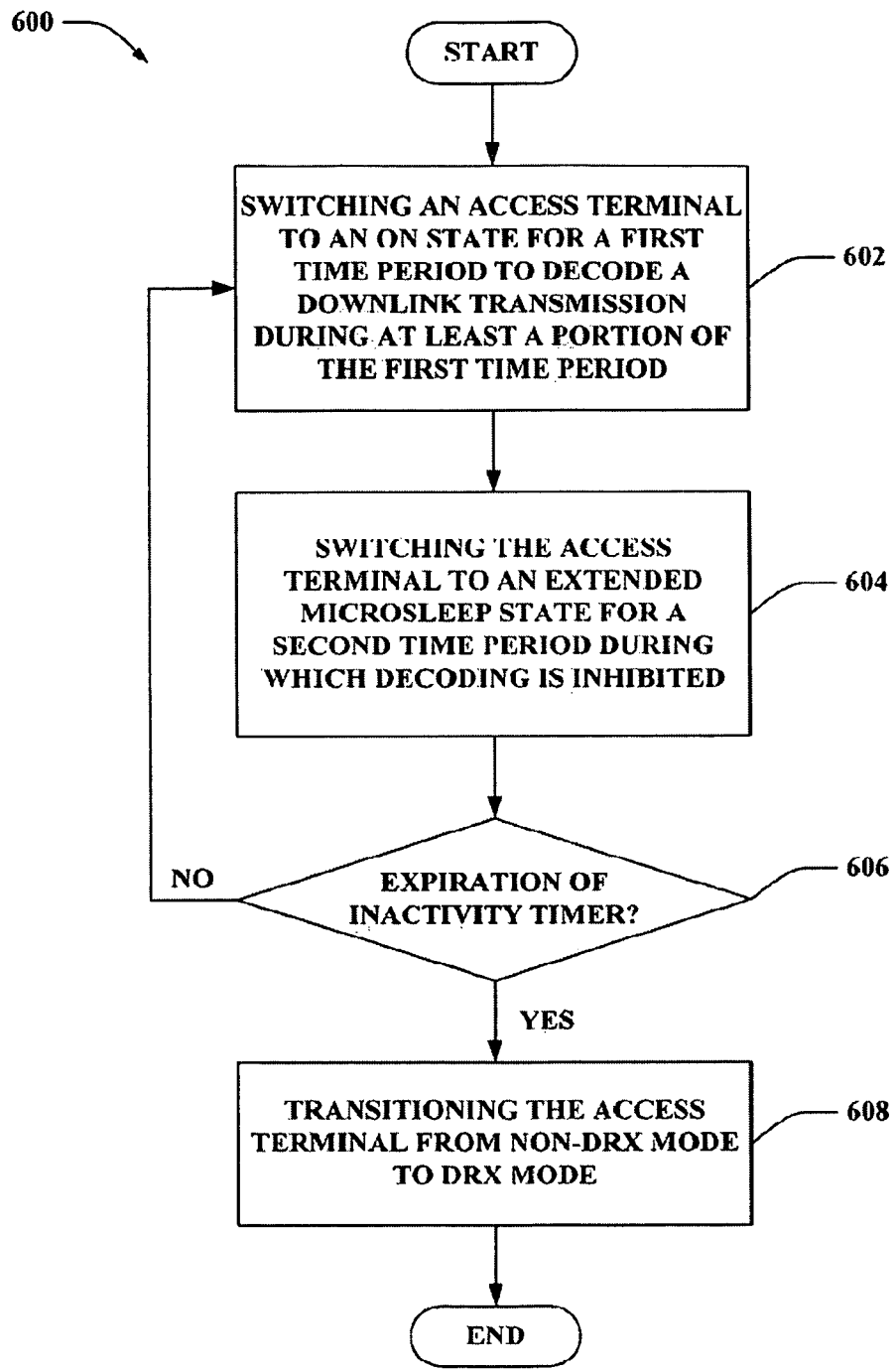
FIG. 6 is an illustration of an example methodology that facilitates using an extended microsleep state for an access terminal in an LTE based wireless communication environment.
Figure 7:
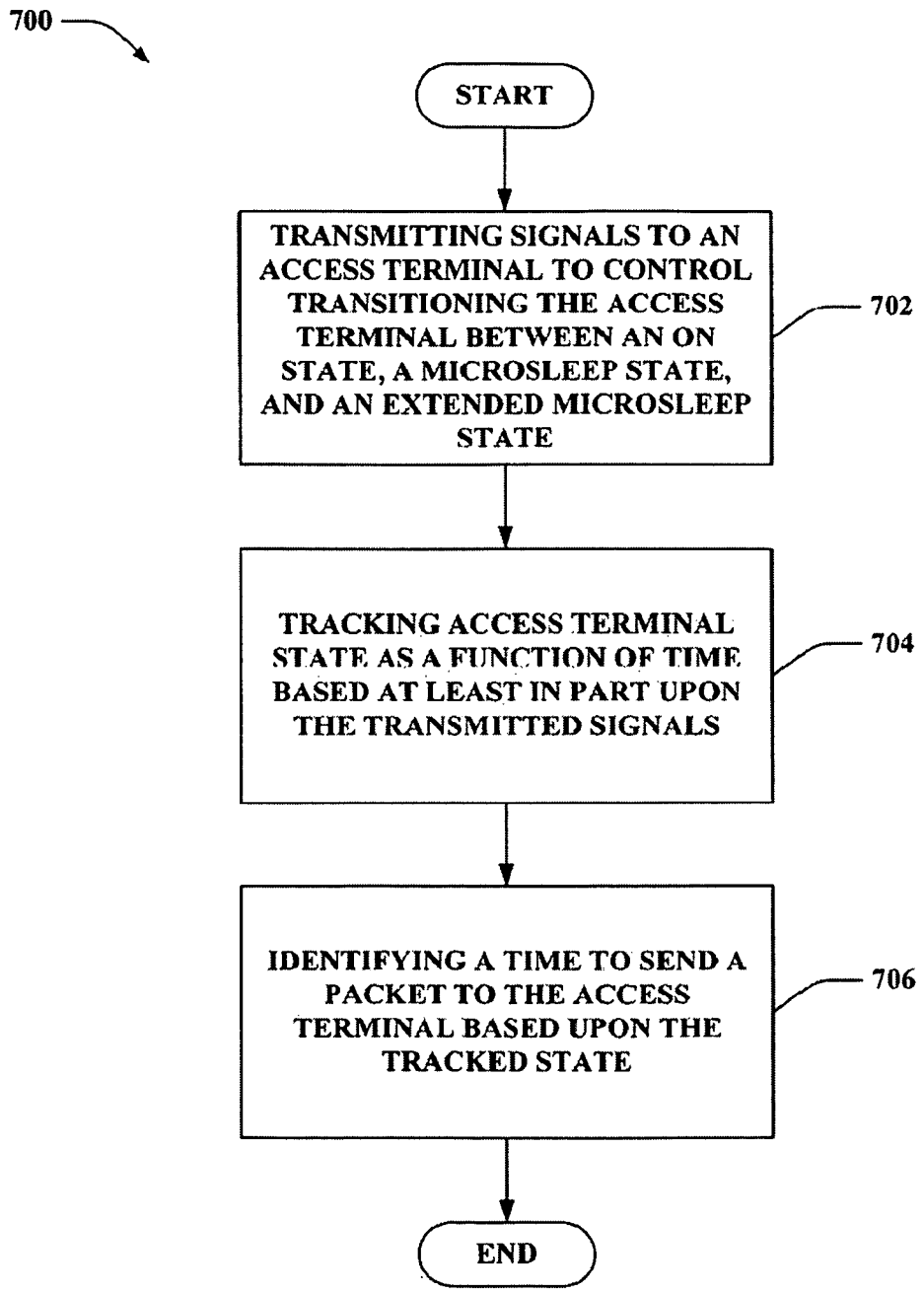
FIG. 7 is an illustration of an example methodology that facilitates controlling a state of an access terminal in an LTE based wireless communication environment.

Referring to FIGS. 5-7, methodologies relating to utilizing an extended microsleep state in an LTE based wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 5, illustrated is a methodology 500 that facilitates operating an access terminal in an LTE based wireless communication environment. At 502, an access terminal can be switched to an on state for a first time period of a pattern to decode a downlink transmission during at least a portion of the first time period. For instance, such switching can occur while the access terminal is in a non-DRX mode (e.g., CRX mode); the access terminal can transition to non-DRX mode from a DRX mode based upon MAC signaling, data being received, sending transmissions over a Random Access Channel (RACH), and so forth. Moreover, the first time period can be one Transmission Time Interval (TTI) (e.g., 1 ms, approximately 1 ms, . . . ), for example. The TTI can be split into a control channel part and a data part. Further, decoding of the downlink transmission can occur during the control channel part of the TTI (e.g., the first half of the TTI associated with the control channel part can be the portion of the first time period that is decoded). If such downlink transmission is determined to be directed to the access terminal, then the data part of the TTI can be decoded; else, switching can be effectuated to transition from the on state to a microsleep state for the second half of the TTI (e.g., where decoding by the access terminal can be inhibited). According to an example, switching to the on state can occur based upon explicit MAC signaling. By way of a further illustration, switching to the on state can be effectuated as a function of a predefined pattern. Further, a combination of explicit MAC signaling and a predefined pattern can be used to control switching to the on state.

At 504, the access terminal can be switched to an extended microsleep state for a second time period of the pattern during which decoding is inhibited. The second time period can be a plurality of TTIs. According to an example, the second time period can be 5 TTIs (e.g., 5 ms, approximately 5 ms, . . . ); however, the claimed subject matter is not so limited. During the second time period, neither the control channel part nor the data part of the associated TTIs are decoded by the access terminal. Rather, the access terminal can sleep during the second time period to yield power savings. At 506, continuation of switching the access terminal between states can be effectuated according to the pattern by repeating the first time period and the second time period in an alternating manner. The pattern can be continued so long as the access terminal remains operating in non-DRX mode.

Turning to FIG. 6, illustrated is a methodology 600 that facilitates using an extended microsleep state for an access terminal in an LTE based wireless communication environment. At 602, an access terminal can be switched to an on state for a first time period to decode a downlink transmission during at least a portion of the first time period. At 604, the access terminal can be switched to an extended microsleep state for a second time period during which decoding is inhibited. At 606, a determination can be made concerning whether an inactivity timer has expired. For instance, the inactivity timer can compare a threshold amount of time to an amount of time since a last decoded downlink transmission was determined to be directed to the access terminal. The threshold amount of time can be predefined, generated based upon a function, retrieved from memory, adjusted by a user, altered based upon trend analysis, controlled by a signal sent from a base station, and so forth. If the inactivity timer is determined to have not expired at 606, then the methodology 600 returns to 602. By returning to 602, switching to the on state for the first time period and switching to the extended microsleep state for the second time period can be repeated in an alternating manner until the inactivity timer expires. Further, if the inactivity timer is determined to have expired at 606, then the methodology 600 continues to 608. At 608, the access terminal can be transitioned from non-DRX mode (e.g., CRX mode) to DRX mode. Further, the aforementioned repeating of switching from on state to extended microsleep state can be employed during an "on-duration" of DRX. Moreover, it is also to be appreciated that the access terminal can transition to DRX mode in response to MAC signaling (e.g., in addition to or instead of use of the inactivity timer), for example.

Referring to FIG. 7, illustrated is a methodology 700 that facilitates controlling a state of an access terminal in an LTE based wireless communication environment. At 702, signals can be transmitted to an access terminal to control transitioning between an on state, a microsleep state, and an extended microsleep state. For instance, these signals can be sent while the access terminal is operating in a non-DRX mode. Further, these signals can be transferred to configure an extended microsleep pattern that includes two repeated time periods; thus, the signals can control the access terminal to be in the on state for a first time period and in the extended microsleep state for a second time period (e.g., where the first and second time periods can be repeated based upon the transferred signals). By way of illustration, the extended microsleep pattern can constrain the access terminal to turn on a receiver for at least a portion of the first time period (e.g., 1 TTI, 1 ms, . . . ) and turn off the receiver for the second time period (e.g., 5 TTIs, 5 ms, . . . ). At 704, access terminal state can be tracked as a function of time based at least in part upon the transmitted signals. Further, it is also contemplated that the mode (e.g., DRX, non-DRX, . . . ) in which the access terminal is operating can be tracked as a function of time. At 706, a time to send a packet to the access terminal can be identified based upon the tracked state. Accordingly, the packet can be sent to the access terminal when it is determined that the access terminal will be decoding data sent over the downlink rather than at a time when the access terminal is sleeping.

It will be appreciated that, in accordance with one or more aspects described herein, inferences can be made regarding employing extended microsleep. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences pertaining to determining whether to transition an access terminal into or out of extended microsleep. By way of further illustration, an inference can be made related to determining a state and/or mode in which an access terminal is operating. It will be appreciated that the foregoing examples are illustrative in nature and are not intended to limit the number of inferences that can be made or the manner in which such inferences are made in conjunction with the various embodiments and/or methods described herein.

Figure 8:
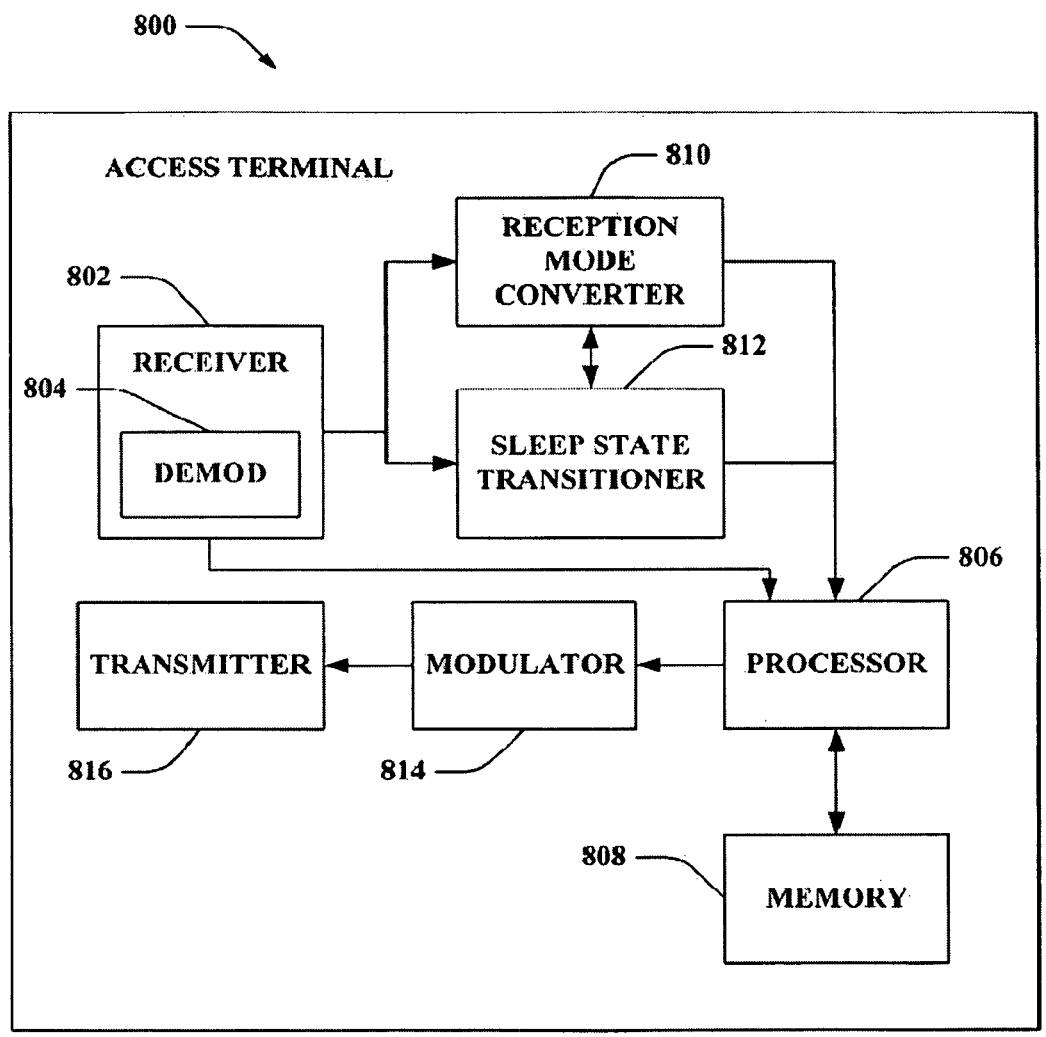
FIG. 8 is an illustration of an example access terminal that utilizes extended microsleep in an LTE based wireless communication system.

FIG. 8 is an illustration of an access terminal 800 that utilizes extended microsleep in an LTE based wireless communication system. Access terminal 800 comprises a receiver 802 that receives a signal from, for instance, a receive antenna (not shown), and performs typical actions thereon (e.g., filters, amplifies, downconverts, etc.) the received signal and digitizes the conditioned signal to obtain samples. Receiver 802 can be, for example, an MMSE receiver, and can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of access terminal 800, and/or a processor that both analyzes information received by receiver 802, generates information for transmission by transmitter 816, and controls one or more components of access terminal 800.

Access terminal 800 can additionally comprise memory 808 that is operatively coupled to processor 806 and that can store data to be transmitted, received data, and any other suitable information related to performing the various actions and functions set forth herein. Memory 808 can additionally store protocols and/or algorithms associated with leveraging extended microsleep.

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Receiver 802 is further operatively coupled to a reception mode converter 810 and/or a sleep state transitioner 812, which can be substantially similar to reception mode converter 208 of FIG. 2 and sleep state transitioner 212 of FIG. 2. Moreover, although not shown, it is contemplated that access terminal 800 can include an inactivity timer substantially similar to inactivity timer 210 of FIG. 2. Reception mode converter 810 can control a reception mode employed by access terminal 800. For instance, reception mode converter 810 can switch access terminal 800 between DRX mode and non-DRX mode (e.g., CRX mode). Reception mode converter 810 can utilize obtained signals (e.g., received via receiver 802, . . . ) to adjust the reception mode, for example. According to another illustration, whether an inactivity timer has expired can be leveraged by reception mode converter 810 to decipher when to change reception mode. Further, reception of data (e.g., via receiver 802, . . . ) and/or Random Access Channel (RACH) transmission by access terminal 800 can cause reception mode converter 810 to modify the reception mode being utilized. Moreover, sleep state transitioner 812 can transition access terminal 800 between an on state, a microsleep state, and an extended microsleep state as described herein. For instance, depending upon the state set by sleep state transitioner 812, receiver 802 (and/or demodulator 804) can be on or off (e.g. activated or deactivated). By way of further example, sleep state transitioner 812 can switch between states based at least in part upon a predefined pattern (e.g., 1 ms in on state, 5 ms in extended microsleep state, 1 ms in on state, 5 ms in extended microsleep state, repeated, . . . ). Additionally or alternatively, sleep state transitioner 812 can alter the state of access terminal 800 in response to explicit MAC signaling. Access terminal 800 still further comprises a modulator 814 and a transmitter 816 that transmits the signal to, for instance, a base station, another access terminal, etc. Although depicted as being separate from the processor 806, it is to be appreciated that reception mode converter 810, sleep state transitioner 812 and/or modulator 814 can be part of processor 806 or a number of processors (not shown).

Figure 9:
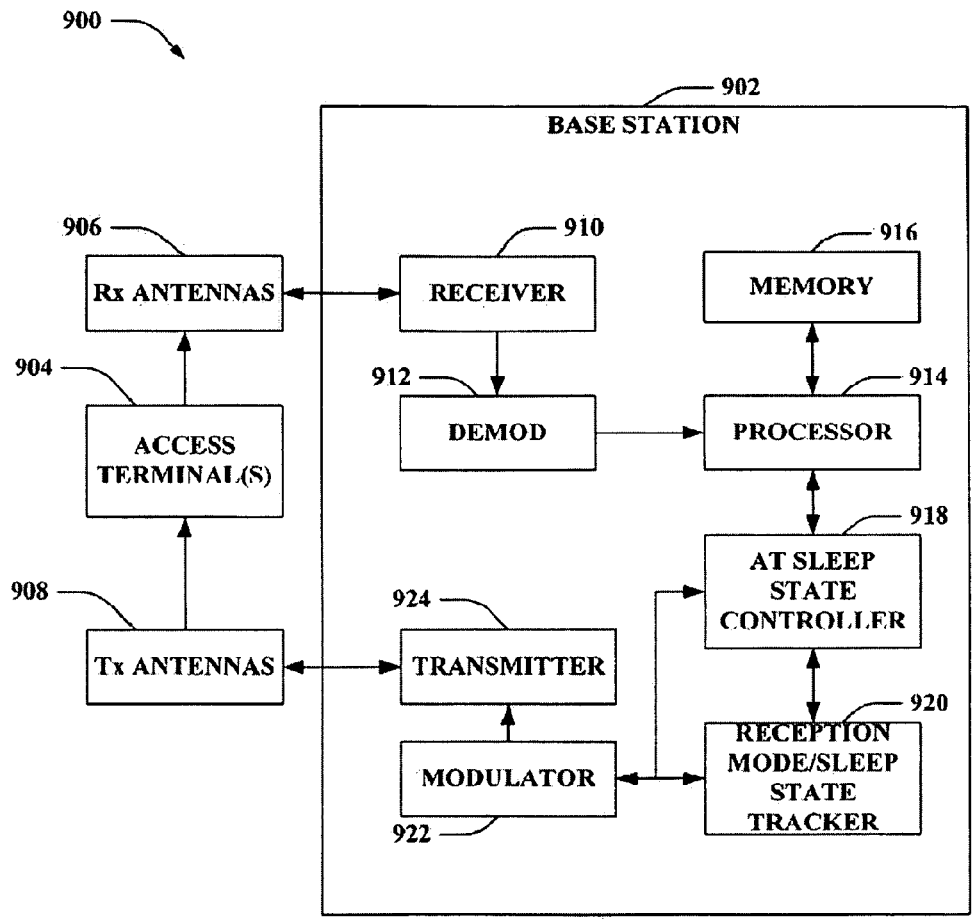
FIG. 9 is an illustration of an example system that facilitates controlling a state of an access terminal in an LTE based wireless communication environment.

FIG. 9 is an illustration of a system 900 that facilitates controlling a state of an access terminal in an LTE based wireless communication environment. System 900 comprises a base station 902 (e.g., access point, . . . ) with a receiver 910 that receives signal(s) from one or more access terminals 904 through a plurality of receive antennas 906, and a transmitter 922 that transmits to the one or more access terminals 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores data to be transmitted to or received from access terminal(s) 904 (or a disparate base station (not shown)) and/or any other suitable information related to performing the various actions and functions set forth herein. Processor 914 is further coupled to an access terminal (AT) sleep state controller 918 that generates signal(s) that can be sent to access terminal(s) 904 to control associated states (e.g., on, microsleep, extended microsleep, . . . ). For instance, signal(s) yielded by AT sleep state controller 918 can initiate access terminal(s) 904 to effectuate trasitioning between states.

AT sleep state controller 918 can be operatively coupled to a reception mode/sleep state tracker 920 that monitors states and/or reception modes of access terminal(s) 904 over time. For instance, reception mode/sleep state tracker 920 can utilize signal(s) yielded by AT sleep state controller 918 to effectuate such monitoring. Further, data yielded by reception mode/sleep state tracker 920 can be leveraged by base station 902 in connection with selecting time(s) during which to send packet(s) to access terminal(s) 904 via the downlink. It is contemplated, for instance, that AT sleep state controller 918 can be substantially similar to AT sleep state controller 214 of FIG. 2 and/or reception mode/sleep state tracker 920 can be substantially similar to reception mode/sleep state tracker 216 of FIG. 2. Further, AT sleep state controller 918 and/or reception mode/sleep state tracker 920 can provide data to be transmitted to a modulator 922. According to another illustration, reception mode/sleep state tracker 920 can identify when data provided to modulator 922 should be transmitted. Modulator 922 can multiplex a frame for transmission by a transmitter 926 through antenna 908 to access terminal(s)

904. Although depicted as being separate from the processor 914, it is to be appreciated that AT sleep state controller 918, reception mode/sleep state tracker 920 and/or modulator 922 can be part of processor 914 or a number of processors (not shown).

Figure 10:
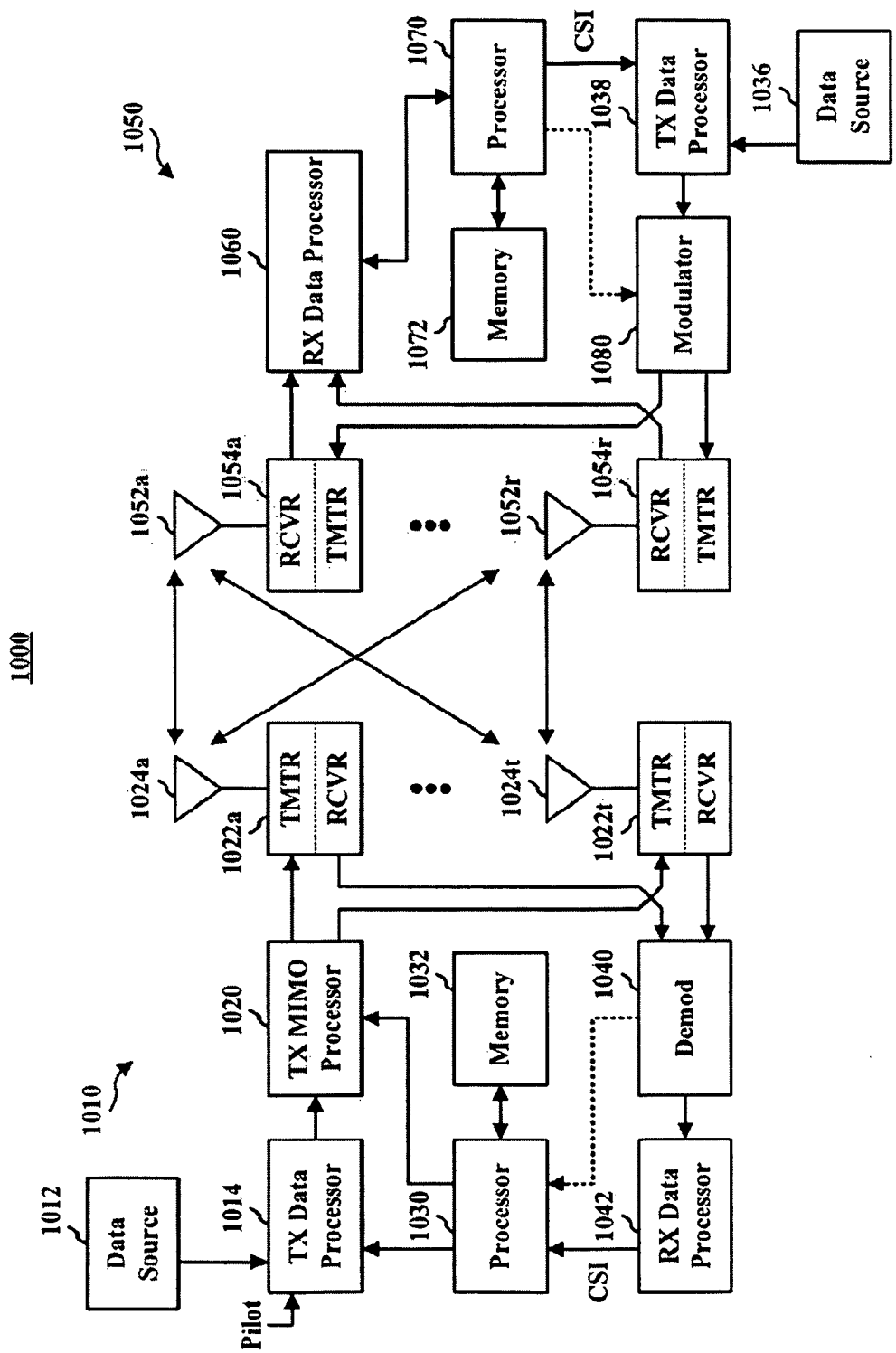
FIG. 10 is an illustration of an example wireless network environment that can be employed in conjunction with the various systems and methods described herein.

FIG. 10 shows an example wireless communication system 1000. The wireless communication system 1000 depicts one base station 1010 and one access terminal 1050 for sake of brevity. However, it is to be appreciated that system 1000 can include more than one base station and/or more than one access terminal, wherein additional base stations and/or access terminals can be substantially similar or different from example base station 1010 and access terminal 1050 described below. In addition, it is to be appreciated that base station 1010 and/or access terminal 1050 can employ the systems (FIGS. 1-2, 8-9, and 11-12) and/or methods (FIGS. 5-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MEMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At access terminal 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which available technology to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from access terminal 1050 are received by antennas 1024, conditioned by receivers 1022, demodulated by a demodulator 1040, and processed by a RX data processor 1042 to extract the reverse link message transmitted by access terminal 1050. Further, processor 1030 can process the extracted message to determine which preceding matrix to use for determining the beamforming weights.

Processors 1030 and 1070 can direct (e.g., control, coordinate, manage, etc.) operation at base station 1010 and access terminal 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bidirectional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
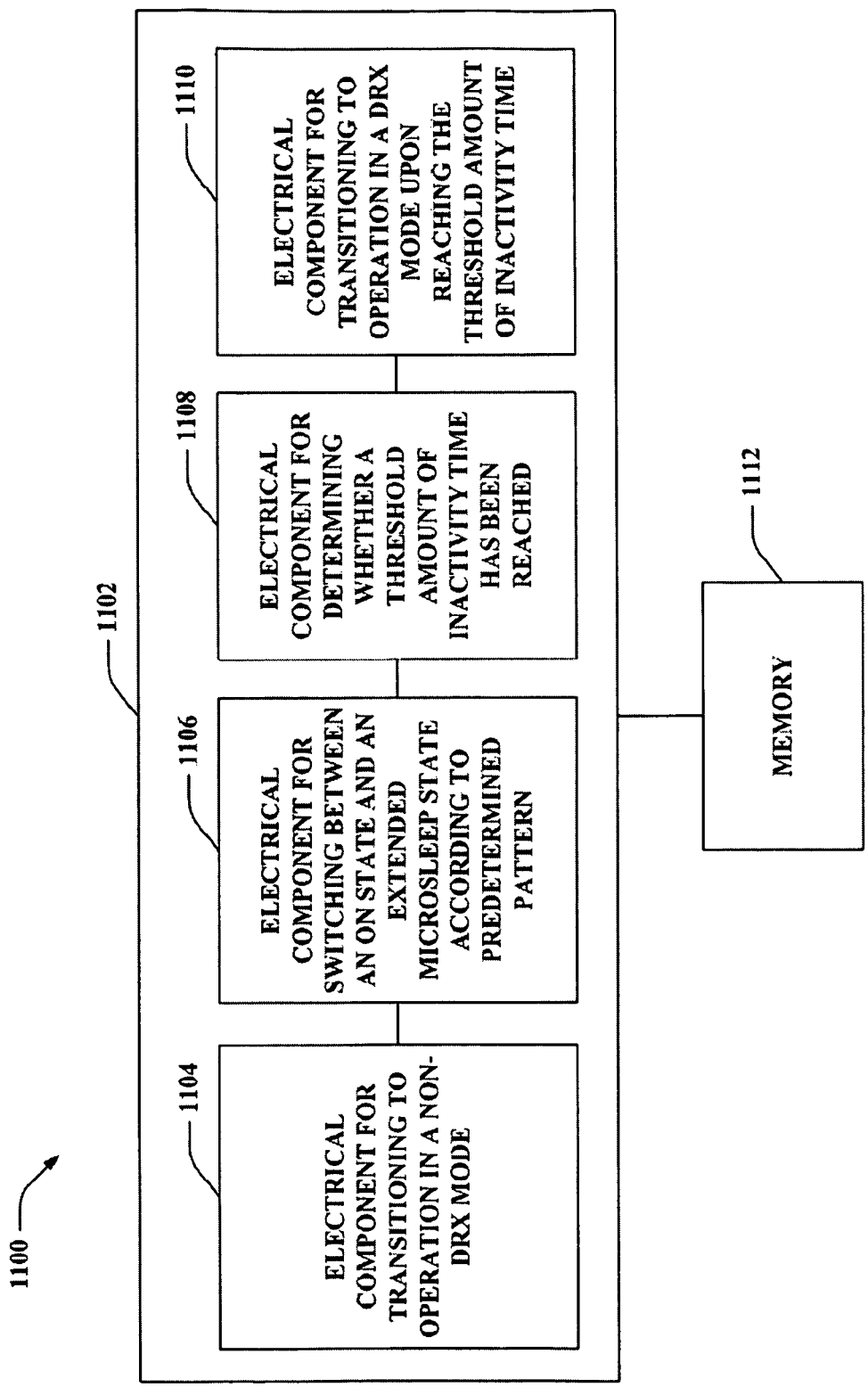
FIG. 11 is an illustration of an example system that enables operating an access terminal with changeable reception mode and sleep state in an LTE based wireless communication environment.

With reference to FIG. 11, illustrated is a system 1100 that enables operating an access terminal with changeable reception mode and sleep state in an LTE based wireless communication environment. For example, system 1100 can reside within an access terminal. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for transitioning to operation in a non-DRX mode 1104. For example, the reception mode can be transitioned to non-DRX (e.g., CRX) from DRX upon receiving a signal from a base station, obtaining data intended for the recipient access terminal, sending a transmission over a Random Access Channel (RACH), and so forth. Further, logical grouping 1102 can include an electrical component for switching between an on state and an extended microsleep state according to a predetermined pattern 1106. The predetermined pattern can set forth a first time period during which a receiver of the access terminal is activated and a second time period during which the receiver is sleeping (e.g., deactivated); the first time period and the second time period can be alternating and repeating. Moreover, logical grouping 1102 can comprise an electrical component for determining whether a threshold amount of inactivity time has been reached 1108. Logical grouping 1102 can also include an electrical component for transitioning to operation in a DRX mode upon reaching the threshold amount of inactivity time 1110. Additionally, system 1100 can include a memory 1112 that retains instructions for executing functions associated with electrical components 1104, 1106, 1108, and 1110. While shown as being external to memory 1112, it is to be understood that one or more of electrical components 1104, 1106, 1108, and 1110 can exist within memory 1112.

Figure 12:
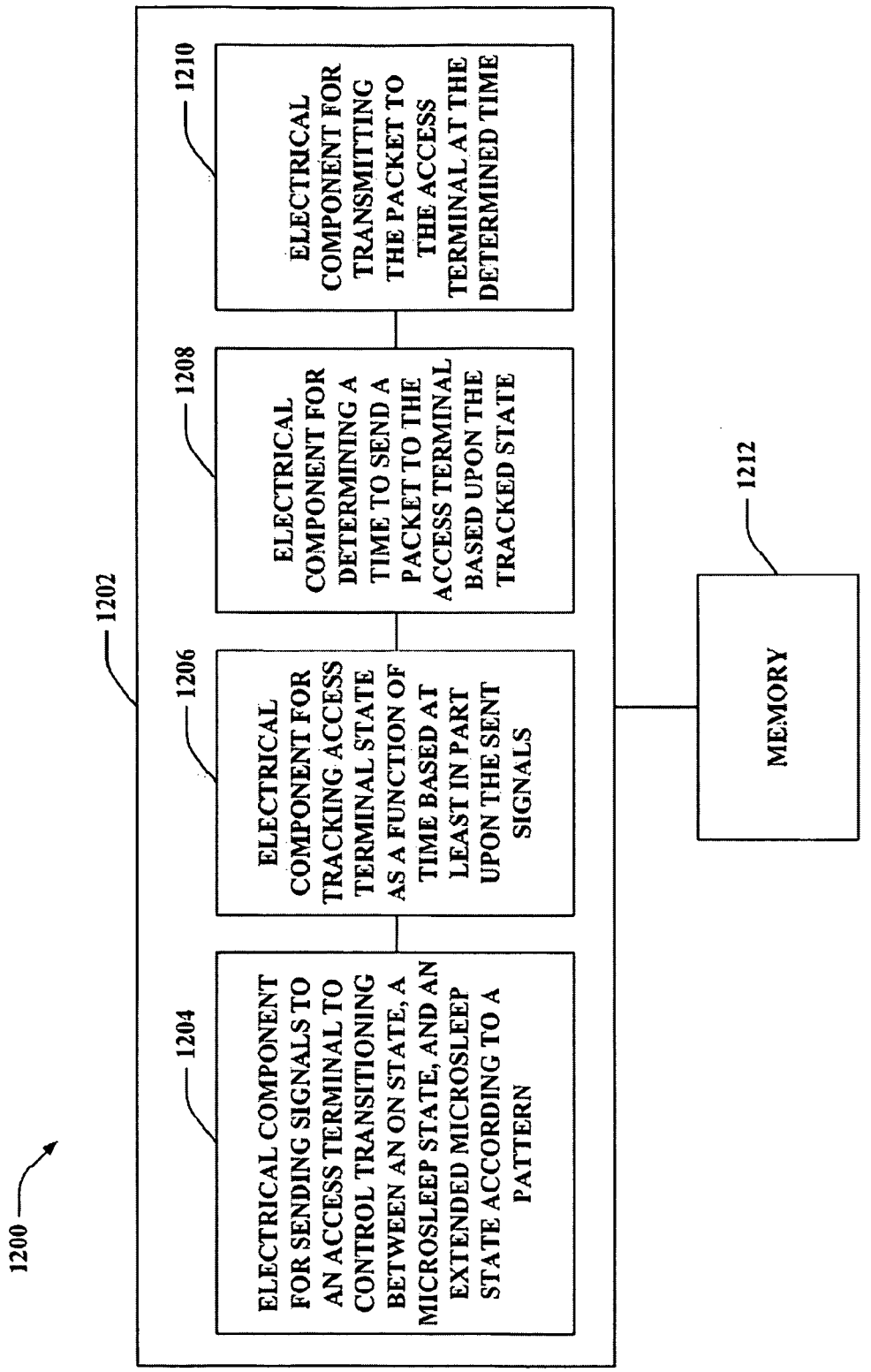
FIG. 12 is an illustration of an example system that enables managing sleep states of an access terminal in an LTE based wireless communication environment.

Turning to FIG. 12, illustrated is a system 1200 that enables managing sleep states of an access terminal in an LTE based wireless communication environment. System 1200 can reside at least partially within a base station, for instance. As depicted, system 1200 includes functional blocks that can represent functions implemented by a processor, software, or combination thereof (e.g., firmware). System 1200 includes a logical grouping 1202 of electrical components that can act in conjunction. Logical grouping 1202 can include an electrical component for sending signals to an access terminal to control transitioning between an on state, a microsleep state, and an extended microsleep state according to a pattern 1204. Further, logical grouping 1202 can include an electrical component for tracking access terminal state as a function of time based at least in part upon the sent signal 1206. Moreover, logical grouping 1202 can comprise an electrical component for determining a time to send a packet to the access terminal based upon the tracked state 1208. Also, logical grouping 1202 can include an electrical component for transmitting the packet to the access terminal at the determined time 1210. Additionally, system 1200 can include a memory 1212 that retains instructions for executing functions associated with electrical components 1204, 1206, 1208, and 1210. While shown as being external to memory 1212, it is to be understood that electrical components 1204, 1206, 1208, and 1210 can exist within memory 1212.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates operating an access terminal in a wireless communication environment, comprising:

switching an access terminal to an on state for at least a portion of a first time period of a pattern to decode a downlink transmission;

switching the access terminal to a microsleep state during at least a portion of the first time period during which decoding is inhibited;

switching the access terminal to an extended microsleep state for a second time period of the pattern during which decoding is inhibited; and continuing to switch the access terminal between states according to the pattern by repeating the first time period and the second time period in an alternating manner in a non-discontinuous reception mode; and switching between the on state and the extended microsleep state during an on duration of a discontinuous reception mode, the extended microsleep state having a duration that is an integer multiple of the first time period, wherein the discontinuous reception mode comprises the on duration followed by an off duration.

2. The method of claim 1, further comprising:

determining whether an inactivity timer has expired; and transitioning the access terminal from the non-discontinuous reception mode to the discontinuous reception mode upon the inactivity timer being determined to have expired.

3. The method of claim 1, further comprising initiating switching between the on state and the extended microsleep state upon the access terminal transitioning to the non-discontinuous reception mode.

4. The method of claim 3, further comprising transitioning the access terminal to the non-discontinuous reception mode based upon at least one of media access control signaling, data directed to the access terminal being received, or sending a transmission over a random access channel.

5. The method of claim 1, the first time period being one transmission time interval and the second time period being a plurality of transmission time intervals.

6. The method of claim 1, the first time period being approximately 1 millisecond and the second time period being approximately 5 millisecond.

7. The method of claim 1, further comprising switching the access terminal between states based upon at least one of a predefined pattern or explicit media access control signaling.

8. The method of claim 1, further comprising:

decoding a control channel part of a transmission time interval associated with the first time period during which the access terminal is in the on state; and decoding a data part of the transmission time interval associated with the first time period when the control channel part includes a transmission directed to the access terminal.

9. The method of claim 1, further comprising:

decoding a control channel part of a transmission time interval associated with the first time period during which the access terminal is in the on state; and wherein switching to the microsleep comprises switching to the microsleep state during a data part of the transmission time interval associated with the first time period when the control channel part lacks a transmission directed to the access terminal.

10. The method of claim 1, further comprising inhibiting the access terminal from receiving and decoding control channel parts and data parts of transmission time intervals associated with the second time period during which the access terminal is in the extended microsleep state.

11. A wireless communications apparatus, comprising:

a memory that retains instructions related to switching to an on state for at least a portion of a first time period to decode a downlink transmission, switching to a micro sleep state during at least a portion of the first time period during which decoding is inhibited, switching to an extended microsleep state for a second time period during which decoding is inhibited, determining whether an inactivity timer has expired, continuing to switch between states in a repeated, alternating manner in a non-discontinuous reception mode so long as the inactivity timer is determined to have not expired, transitioning to a discontinuous reception mode upon the inactivity timer being determined to have expired, and switching between the on state and the extended microsleep state during an on duration of the discontinuous reception mode, the extended microsleep state having a duration that is an integer multiple of the first time period, wherein the discontinuous reception mode comprises the on duration followed by an off duration; and a processor, coupled to the memory, configured to execute the instructions retained in the memory.

12. The wireless communications apparatus of claim 11, wherein the memory further retains instructions related to beginning switching between the on state and the extended microsleep state from the discontinuous reception mode.

13. The wireless communications apparatus of claim 12, wherein the memory further retains instructions related to transitioning an access terminal from the discontinuous reception mode based upon at least one of media access control signaling, data directed to an access terminal being received, or sending a transmission over a random access channel.

14. The wireless communications apparatus of claim 11, wherein the first time period is one transmission time interval and the second time period is a plurality of transmission time intervals.

15. The wireless communications apparatus of claim 11, wherein the memory further retains instructions related to switching between states based upon at least one of a predefined pattern or explicit media access control signaling.

16. The wireless communications apparatus of claim 11, wherein the memory further retains instructions related to inhibiting reception and decoding of control channel parts and data parts of transmission time intervals associated with the second time period during which the extended microsleep state is operational.

17. The wireless communications apparatus of claim 11, wherein the memory further retains instructions related to comparing a threshold amount of time to an amount of time since a last decoded downlink transmission was determined to be directed to a receiving access terminal, the threshold amount of time being at least one of predefined, generated based upon a function, retrieved from memory, adjusted by a user, altered based upon trend analysis, or controlled by a signal sent from a base station.

18. A wireless communications apparatus that enables operating an access terminal with changeable mode and sleep state in a wireless communication environment, comprising:

means for transitioning to operation in a non-discontinuous reception mode;

means for switching between an on state and a microsleep state for a first time period during which decoding is inhibited and an extended microsleep state for a second time period according to a predetermined pattern in the non-discontinuous reception mode;

means for determining whether a threshold amount of inactivity time has been reached;

means for transitioning to operation in a discontinuous reception mode upon reaching the threshold amount of inactivity time; and means for switching between the on state and the extended microsleep state during an on duration of the discontinuous reception mode, the extended microsleep state having a duration that is an integer multiple of the first time period, wherein the discontinuous reception mode comprises the on duration followed by an off duration.

19. The wireless communications apparatus of claim 18, further comprising means for transitioning to operation in the non-discontinuous reception mode based upon at least one of media access control signaling, data directed to an access terminal being decoded, or sending a transmission over a random access channel.

20. The wireless communications apparatus of claim 18, wherein the predetermined pattern includes a repeated cycle of a first time period for the on state and a second time period for the extended micro sleep state.

21. The wireless communications apparatus of claim 20, wherein the first time period is one transmission time interval and the second time period is a plurality of transmission time intervals.

22. The wireless communications apparatus of claim 18, further comprising means for switching between the on state and the extended microsleep state based at least in part upon explicit media access control signaling.

23. The wireless communications apparatus of claim 18, further comprising means for inhibiting reception and decoding of control channel parts and data parts of transmission time intervals associated with times during which the extended microsleep state is operational.

24. The wireless communications apparatus of claim 18, wherein the threshold amount of inactivity time is at least one of predefined, generated based upon a function, retrieved from memory, adjusted by a user, altered based upon trend analysis, or controlled by a signal sent from a base station.

25. A computer program product, comprising:
a non-transitory computer-readable medium comprising:
code for switching an access terminal to an on state for at least a portion of a first time period of a pattern to decode a downlink transmission;
code for switching the access terminal to a microsleep state during at least a portion of the first time period during which decoding is inhibited;
code for switching the access terminal to an extended microsleep state for a second time period of the pattern during which decoding is inhibited;
code for continuing to switch the access terminal between states according to the pattern by repeating the first time period and the second time period in an alternating manner in a non-discontinuous reception mode; and
code for switching between the on state and the extended microsleep state during an on duration of a discontinuous reception mode, the extended microsleep state having a duration that is an integer multiple of the first time period, wherein the discontinuous reception mode comprises the on duration followed by an off duration.

26. The computer program product of claim 25, the computer-readable medium further comprises code for determining whether an inactivity timer has expired and code for transitioning the access terminal from the non-discontinuous reception mode to the discontinuous reception mode upon the inactivity timer being determined to have expired.

27. The computer program product of claim 25, the computer-readable medium further comprises code for initiating switching between the on state and the extended microsleep state upon the access terminal transitioning to the non-discontinuous reception mode, wherein transitioning the access terminal to the non-discontinuous reception mode occurs in response to at least one of media access control signaling, data directed to the access terminal being received, or sending a transmission over a random access channel.

28. The computer program product of claim 25, wherein the first time period is one transmission time interval and the second time period is a plurality of transmission time intervals.

29. The computer program product of claim 25, the computer-readable medium further comprises code for switching the access terminal between states based upon at least one of a predefined pattern or explicit media access control signaling.

30. The computer program product of claim 25, the computer-readable medium further comprises code for inhibiting the access terminal from receiving and decoding control channel parts and data parts of transmission time intervals associated with the second time period during which the access terminal is in the extended microsleep state.

31. In a wireless communications system, an apparatus comprising:
a processor device configured to:
switch to an on state for at least a portion of a first time period to decode a downlink transmission;
switch to a microsleep state during at least a portion of the first time period during which decoding is inhibited;
switch to an extended microsleep state for a second time period during which decoding is inhibited;
determine whether an inactivity timer has expired;
continue to switch between states in a repeated, alternating manner so long as the inactivity timer is determined to have not expired in a non-discontinuous reception mode;
transition to a discontinuous reception mode upon the inactivity timer being determined to have expired; and
switch between the on state and the extended micro sleep state during an on duration of the discontinuous reception mode, the extended microsleep state having a duration that is an integer multiple of the first time period, wherein the discontinuous reception mode comprises the on duration followed by an off duration.

32. A method that facilitates controlling a state of an access terminal in a wireless communication environment, comprising:
transmitting signals to an access terminal to control transitioning between an on state, a microsleep state, and an extended microsleep state in accordance with a pattern that includes a first time period and a second time period in a non-discontinuous reception mode and to control transitioning between the on state and the extended microsleep state during an on duration of a discontinuous reception mode, the extended microsleep state having a duration that is an integer multiple of the first time period, wherein the discontinuous reception mode comprises the on duration followed by an off duration, and wherein the transmitted signals control transitioning between the microsleep state and the extended microsleep state during which decoding is inhibited;
tracking access terminal state as a function of time based at least in part upon the transmitted signals;
identifying a time to send a packet to the access terminal based upon the tracked state.

33. The method of claim 32, further comprising transmitting the signals while the access terminal is operating in the non-discontinuous reception mode.

34. The method of claim 32, further comprising transmitting the signals to the access terminal to configure the pattern, wherein the first time period relates to the on state and the second time period relates to the extended microsleep state.

35. The method of claim 34, wherein the pattern constrains the access terminal to switch on a receiver for at least a portion of the first time period related to the on state and switch off the receiver for the second time period related to the extended microsleep state.

36. The method of claim 35, wherein the first time period is one transmission time interval and the second time period is a plurality of transmission time intervals.

37. The method of claim 32, further comprising transmitting the packet to the access terminal at the time when it is determined that the access terminal will effectuate decoding of transmissions transferred via a downlink.

38. A wireless communications apparatus, comprising:
a memory that retains instructions related to sending signals to an access terminal to control switching between an on state, a microsleep state, and an extended microsleep state in accordance with a pattern that includes a first time period and a second time period in a non-discontinuous reception mode and to control switching between the on state and the extended microsleep state during an on duration of a discontinuous reception mode, the extended microsleep state having a duration that is an integer multiple of the first time period, wherein the discontinuous reception mode comprises the on duration followed by an off duration, and wherein the sent signals control transitioning between the microsleep state and the extended microsleep state during which decoding is inhibited, tracking access terminal state as a function of time based at least in part upon the transmitted signals, and recognizing a time to transfer a packet to the access terminal based upon the tracked state; and
a processor, coupled to the memory, configured to execute the instructions retained in the memory.

39. The wireless communications apparatus of claim 38, wherein the memory further retains instructions related to sending the signals while the access terminal is operating in the non-discontinuous reception mode.

40. The wireless communications apparatus of claim 38, wherein the memory further retains instructions related to sending the signals to the access terminal to configure the pattern, wherein the first time period relates to the on state and the second time period relates to the extended micro sleep state.

41. The wireless communications apparatus of claim 40, wherein the extended microsleep pattern constrains the access terminal to switch on a receiver for at least a portion of the first time period related to the on state and switch off the receiver for the second time period related to the extended microsleep state.

42. The wireless communications apparatus of claim 41, wherein the first time period is one transmission time interval and the second time period is a plurality of transmission time intervals.

43. The wireless communications apparatus of claim 38, wherein the memory further retains instructions related to transferring the packet to the access terminal at the time when it is determined that the access terminal will effectuate decoding of transmissions transferred via a downlink.

44. A wireless communications apparatus that enables managing sleep states of an access terminal in a wireless communication environment, comprising:
means for sending signals to an access terminal to control transitioning between an on state, a microsleep state, and an extended microsleep state according to a pattern that includes a first time period and a second time period in a non-discontinuous reception mode and to control transitioning between the on state and the extended microsleep state during an on duration of a discontinuous reception mode, the extended microsleep state having a duration that is an integer multiple of the first time period, wherein the discontinuous reception mode comprises the on duration followed by an off duration, and wherein the transmitted signals control transitioning between the microsleep state and the extended microsleep state during which decoding is inhibited;
means for tracking access terminal state as a function of time based at least in part upon the sent signals;
means for determining a time to send a packet to the access terminal based upon the tracked state; and
means for transmitting the packet to the access terminal at the determined time.

45. The wireless communications apparatus of claim 44, further comprising means for sending the signals while the access terminal is operating in the non-discontinuous reception mode.

46. The wireless communications apparatus of claim 44, wherein the first time period relates to the on state and the second time period relates to the extended microsleep state.

47. The wireless communications apparatus of claim 46, wherein the pattern constrains the access terminal to switch on a receiver for at least a portion of the first time period related to the on state and switch off the receiver for the second time period related to the extended microsleep state.

48. The wireless communications apparatus of claim 47, wherein the first time period is one transmission time interval and the second time period is a plurality of transmission time intervals.

49. A computer program product, comprising:
a non-transitory computer-readable medium comprising:
code for transferring signals to an access terminal to control transitioning between an on state, a microsleep state, and an extended microsleep state according to an extended microsleep pattern that includes a first time period and a second time period in a non-discontinuous reception mode and to control transitioning between the on state and the extended microsleep state during an on duration of a discontinuous reception mode, the extended microsleep state having a duration that is an integer multiple of the first time period, wherein the discontinuous reception mode comprises the on duration followed by an off duration, and wherein the transmitted signals control transitioning between the microsleep state and the extended microsleep state during which decoding is inhibited;
code for tracking access terminal state and access terminal mode as a function of time based at least in part upon the sent signals;
code for deciphering a time to send a packet to the access terminal based upon the tracked state and mode; and
code for sending the packet to the access terminal at the deciphered time.

50. The computer program product of claim 49, the computer-readable medium further comprises code for transferring the signals while the access terminal is operating in the non-discontinuous reception mode.

51. The computer program product of claim 49, wherein the first time period relates to the on state and is one transmission time interval and the second time period relates to the extended microsleep state and is a plurality of transmission time intervals.

52. The computer program product of claim 51, wherein the pattern controls the access terminal to switch on a receiver for at least a portion of the first time period related to the on state and switch off the receiver for the second time period related to the extended microsleep state.

53. In a wireless communications system, an apparatus comprising:
- a processor device configured to:
  - transmit signals to an access terminal to control transitioning between an on state, a microsleep state, and an extended microsleep state in accordance with a pattern that includes a first time period and a second time period in a non-discontinuous reception mode and to control transitioning between the on state and the extended microsleep state during an on duration of a discontinuous reception mode, the extended microsleep state having a duration that is an integer multiple of the first time period, wherein the discontinuous reception mode comprises the on duration followed by an off duration, and wherein the transmitted signals control transitioning between the microsleep state and the extended microsleep state during which decoding is inhibited;
- track access terminal state as a function of time based at least in part upon the transmitted signals; and
- identify a time to send a packet to the access terminal based upon the tracked state.

* * * * *